July 5, 1960

C. S. OST 2,944,190

LIGHT INTEGRATOR

Filed Oct. 28, 1958

INVENTOR
CLARENCE S. OST
BY
Sherman Levy ATTORNEY

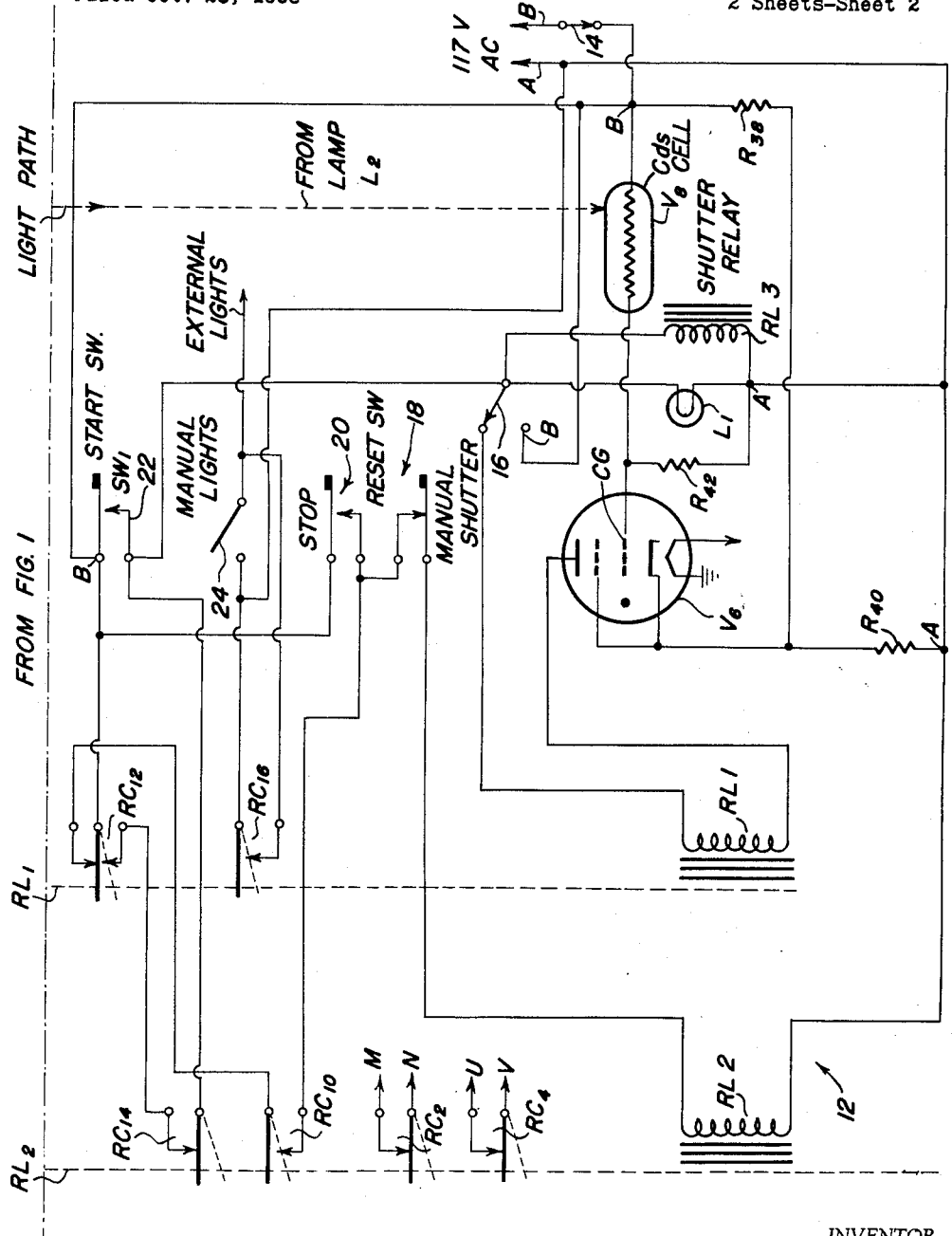

United States Patent Office 2,944,190
Patented July 5, 1960

2,944,190
LIGHT INTEGRATOR
Clarence S. Ost, 118 N. Mansfield Ave., Margate City, N.J.

Filed Oct. 28, 1958, Ser. No. 770,111

9 Claims. (Cl. 315—156)

My invention relates to a new and improved apparatus for integrating radiant energy and more particularly to an instrument for integrating a predetermined quantity of radiant energy and means for indicating when said quantity of energy has been integrated.

The need for a device to carry out the integration of radiant energy is found in a great number of fields and most particularly when a light is projected upon a photosensitive surface as for example in photography, and more particularly in the field of photolithography, photoengraving and gravure where the crucial element is the total amount of light striking the photosensitive surface and is accordingly a product of intensity and time. The problem is particularly acute in the field of the graphic arts where high intensity arc lamps and other high intensity light sources are used.

Arc lamps, as an example, while being highly desirable because of their relatively high light intensity nevertheless have the disadvantage in that their intensity cannot be easily kept constant. The intensity of an arc lamp varies for a number of reasons, as for example line voltage fluctuations, the shape of the carbon tips as they burn, the position of the flame as it rises from the arc, the flaring of the flame about the carbons and the non-uniformity of the carbons. This of course results in a variation of the degree of photochemical effect upon the sensitized material which is attained in any given time. The length of exposure is usually not sufficient to permit the variations in light intensity to average themselves out thus there is a clear need for some means of an integrating nature which will give an exact indication of the total quantity of light falling on a photosensitive surface in a given time, taking into account the interim variations in intensity. Restating the matter, the need exists in the graphic arts for a mechanism which will indicate in point of time when a predetermined quantity of light has fallen on a given photosensitive surface, no matter how long this takes, due to variations in the source, said indicating means may also be used not only for a visual indication to an operator but may automatically be coupled to suitable means for opening and closing a shutter and turning the lamps on and off in correspondence to the desired light values falling upon a photosensitive surface.

In accordance with prior art practice as exemplified in my prior Patent No. 2,408,576, October 1, 1946, one form of integrator comprises an apparatus for feeding a plurality of pulses of electricity through a counter mechanism, the number of pulses fed to the counter mechanism being in proportion to the total quantity of light falling on a phototube of the current conducting type, the counter mechanism in turn indicating the number of pulses and therefore the total amount of light that has fallen on a photosensitive surface during a given period of time, that is, the mechanism counter system used in the prior art gives an indication of the product of light intensity and time. Broadly speaking the prior art utilizes a condenser that is charged with a current flowing through the phototube until the voltage across it reaches the ionization potential of a gaseous discharge tube to which it is connected, in series with a grid resistor also connected to said tube. The condenser after having reached the ionization potential of the gaseous discharge tube causes the gas in the tube to ionize discharging the condenser through the grid resistor. The gaseous discharge tube is in turn connected to a conventional amplifier stage and the amplified pulse fed thereto from the gaseous discharge tube is applied to the coil of a manually settable, spring wound, electromagnetically operated escapement mechanism which in effect is a mechanical device for counting and indicating the pulses. The aforementioned prior art approach to this problem has certain distinct disadvantages. Perhaps the foremost of the disadvantages is in the mechanical counter mechanism used which like most mechanical devices, is subject to considerable wear and tear, and loss of adjustment with frequent repairs and adjustments being necessary in order to maintain accuracy in the apparatus. A further disadvantage found in the prior art is the inaccuracy arising therein not only from the failure and maladjustment of mechanical counting apparatus but also in the failure of and loss in initial values of the aforementioned condensers utilized in said prior art; more particularly integrating condensers with infinite resistance do not exist thereby causing condenser leakage which contributes to inaccuracy in the prior art apparatus, and also due to the fact that though circuit design and choice of elements keeps this resistance to a high value and the attendant condenser leakage to a low value in proportion to photocathode current, such leakage is present in the prior art as a masking factor and introduces a small variable error which is of course greater in proportion, for short exposures than for long exposures.

It is an object of this invention to provide a means overcoming the aforementioned disadvantages of the prior art.

It is another object of this invention to provide a device which will automatically control the exposure of photosensitive materials in accordance with the total quantity of light falling thereon regardless of fluctuations or other variations in the intensity of the light source.

It is a further object to provide a light integrating apparatus that is simple in construction, low in cost and substantially free of mechanical apparatus.

It is an additional object to provide a light integrating device utilizing the charge or discharge of a condenser as a means for integrating said light, the amount of charge or discharge from an initial value of said condenser being an indication of the total amount of light to which the integrating device is subjected.

It is still another object to provide a light integrating device utilizing the amount of charge or discharge of a condenser through a phototube as a means for indicating the total amount of light to which said photoemissive tube is subjected, while cancelling out the error producing effects of condenser leakage.

A further object is to provide a light integrating device adapted to measure and/or automatically control exposure of photosensitive materials in accordance with the total quantity of light falling thereon, said aparatus having means for providing an aural or visual indication of the total amount of light on said photosensitive material and also including means, if so desired, to automatically terminate the exposure as well as to give an audible or visual signal.

Still an additional object is to provide an assembly of apparatus of electrical character which may be actuated by the usual electrical current from conventional A.C. mains, and will be independent of variations in line voltage.

Still a further object is to provide a light integrating device for use in conjunction with photosensitive material, having means for turning on a set of lights and opening a shutter at the beginning of an exposure operation and extinguishing said lights and closing said shutter when a predetermined quantity of light has fallen on a photosensitive material.

My instant invention is based upon a balanced bridge design utilizing two negative grid bias condensers that are hereinafter designated as negative grid bias supplies. The circuit employs two triodes connected in a conventional cathode follower arrangement, each cathode follower having a resistor string in the cathode circuit thereof, said cathode circuits forming the arms of the aforementioned bridge. Suitable switching means is provided and the resistor values are so chosen as to provide three ranges on the instrument. At the outset the circuit is balanced for zero reading on a meter across said cathode circuits, when opposite terminals of the meter are connected to equal values of resistance above ground. This adjustment is made initially while both condensers are connected to a point on a voltage divider, which is approximately one-sixth of the plate supply.

The principle of operation consists essentially of unbalancing the meter circuit by choosing, in one cathode resistor string, the value of resistance above ground that gives a meter reading analogous to the amount of radiant energy to be integrated, that is, the total amount of light to be absorbed by a photosensitive material. Relay contacts then open the grid condenser circuits of both triodes allowing one of the circuits to float while the other is connected to a photoemissive tube. The current through the phototube, which conventionally is in direct proportion to the intensity of radiation striking its photosensitive cathode, charges or discharges the condenser connected thereto reestablishing the meter to balance by increasing or lowering the current in its associated cathode resistor string. The instantaneous voltage across the aforementioned condenser at any particular time after commencement of charge or discharge thereof through the photoemissive tube, subtracted from its initial voltage, is analogous to the sum of an infinitely large number of infinitely small intensities of light occurring since the start. Stating the situation another way, the voltage across the condenser at any instant is proportional to the total quantity of radiant energy measured from the start of the exposure.

These and other objects, advantages and novel features of the invention will be apparent from the following description and the accompanying drawings wherein:

Figure 2 is a schematic wiring diagram of one apparatus adapted to be used in conjunction with the light integrating device shown in Figure 1, for purposes of automatically starting and stopping any type of auxiliary apparatus.

Figure 1:
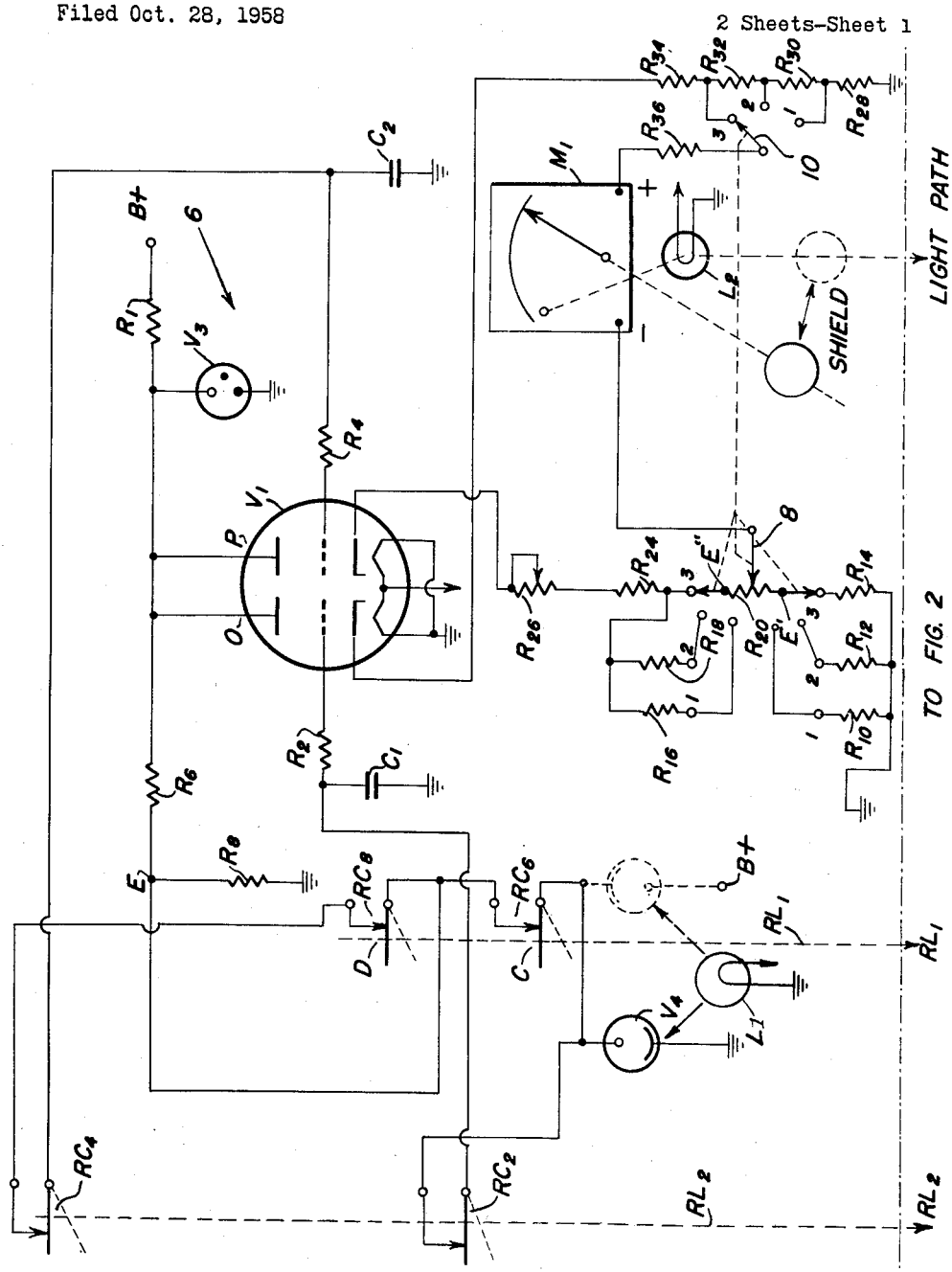
Figure 1 is a schematic wiring diagram of the light integrating and indicating portion of the instant invention.

Referring to the accompanying drawings wherein like reference characters designate like or corresponding parts throughout the several views, there is shown in Figure 1 a light integrator circuit 6 produced in accordance with the instant invention, and in Figure 2 an automatic control circuit that is adapted to be used in conjunction with the structure shown in Figure 1. It is however emphasized that the structure shown in Figure 1 need not necessarily be used only with the structure shown in Figure 2, other control structures being usable with the integrator circuit shown in Figure 1, and hereinafter described as a light integrator.

The light integrator circuit 6 comprises a dual triode V1 such as the tube type 12AU7 for example, consisting of an O section and a P section. The plates of the respective O and P sections of the tube V1 are connected in parallel with one another, and to a suitable source of regulated B plus supply (see voltage regulator V3 and associated resistor R1). The grids of the respective O and P sections are connected to grid resistors R2 and R4 respectively.

The grids of the respective tube sections O and P also have connected thereto a pair of grid bias condensers C1 and C2 respectively, said condensers also being connected to the resistors R2 and R4. The grid sides of the condensers C1 and C2 are respectively connected, through relay actuated switches RC2 and RC4 and through relay switches RC6 and RC8 to a common source of charging voltage. The charging voltage which is approximately one-sixth of the B plus supply is provided by a voltage divider network connected across the regulated B plus supply, said voltage divider network consisting of resistors R6 and R8. In addition a photoemissive tube V4 has the anode or cathode (as shown in dashed lines) portion thereof connected to the condenser C1 through the relay switch RC2. The tube V4 is adapted to be exposed to a source of light to be integrated, said source being indicated symbolically by a lamp L1 in Fig. 1.

As previously pointed out, each of the triode sections O and P is connected as a conventional cathode follower. Each cathode in tube V1 has associated therewith a resistor string. The cathode in section P has the resistor string comprising the resistors R10, R12, R14, R16, R18, potentiometer R20, R24 and the variable resistor R26. The cathode in tube section O is provided with a resistor string comprising the resistors R28, R30, R32 and R34.

It is pointed out that each of the resistor strings is connected to ground so as to form each of the two branches of a Wheatstone bridge. The bridge circuit further includes a meter M1 having one of its terminals connected, through a slider 8 that is in contact with the potentiometer R20, inserted in one branch of the bridge between resistors R19 and R24, while the other terminal of the meter is connected through a calibrating resistor R36 and a range switch 10 with the O section cathode resistor string to a point between resistors R32, R34. The above is as shown in Figure 1 with range switch 10 in position three.

In accordance with the preferred embodiment of the invention, the meter M1 is of a microampere type, and the resistor values are so arranged that by adjusting the slider 8 along potentiometer R20, a zero reading may be obtained on the meter M1 in a manner hereinafter described, and for the purposes set forth.

Attention is directed to Figure 2 wherein is shown a schematic wiring diagram of what will hereinafter be referred to as an automatic control circuit 12 for use in actuating a camera shutter, lights, etc., but which it is emphasized, may be used for actuating various devices other than those mentioned. The control circuit 12 is connected to a 117-volt A.C. line through a main power-on switch 14.

A gaseous tetrode or thyratron V6, of the 2D21 type for example, is connected across the 117-volt A.C. line. The plate circuit of the thyratron V6 is series connected through a relay RL1, hereinafter referred to as a start relay, which in turn is connected through a manual shutter switch 16, to one side of the A.C. line. The cathode of the thyratron V6 is connected to a point on a voltage divider across the 117 volt A.C. source consisting of resistors R38 and R40.

It is pointed out that a shutter or any other means adapted to be actuated by the instant apparatus is adapted to be connected in parallel with the lamp L1 as indicated symbolically by RL3. Switch 16, as can be seen by the diagram, is so connected as to open the plate circuit of the thyratron V6, when manually initiating the instant apparatus mentioned above so as to render the integrating circuit inoperative under such condition of manual initiation.

It is emphasized that the relay RL3 is used symbolically in Figure 2, and that said relay is, for example, adapted to actuate a camera shutter, opening said shutter at the beginning of a light integration cycle, and then allowing said shutter to close when a predetermined amount of light has been integrated, tube V6 having been rendered non-conductive at this point, all of which is hereinafter described in greater detail.

The control grid CG of the thyratron obtains its negative grid bias voltage through a voltage divider consisting of the resistors R40 and R38 which are connected across the A.C. power source. The critical or ignition grid voltage of the thyratron is obtained from a point on a voltage divider consisting of a cadmium sulphide photoresistive device V8 connected in series with resistor R42 across the A.C. line. The photoresistive device V8 is adapted to be exposed to light from a lamp L2 that also serves as a power-on indicator lamp in the main A.C. line, but which will hereinafter be referred to simply as an exciter lamp L2.

A second relay RL2, hereinafter referred to as a stop relay, is connected across the main A.C. line through a series of hereinafter described switches. One side of the stop relay RL2 is series connected through a normally closed manual reset switch 18 to a normally open manual stop switch 20 and a normally open manual start switch 22. The relay RL2 is further connected, through the reset switch 18, to relay contacts RC12 which are actuated by relay RL1, and RC10 and RC14 actuated by relay RL2. Another set of relay contacts RC16 with manually operable switch 24 in parallel therewith is utilized for automatically connecting a series of external lights to the main power line for purposes of turning on said lights at the beginning of an exposure for example. The relay contacts RC16 are actuated by relay RL1.

The function of the various relay contacts and switches described above will hereinafter be set forth under the heading of "Operation." As can be seen in Figure 2, the shutter switch 16 is interlocked with a start switch 22 and relay RL1 so as to render the start switch inoperative when the shutter switch 16 is in a downward position. The two relays RL1 and RL2 are interlocked by the relay contacts RC10, RC12, and RC14 so that relay RL1 will drop out when relay RL2 pulls in, as hereinafter described in greater detail.

Operation

Before describing the operation of the instrument, it should be pointed out that two modes of operation are possible. As indicated earlier in the description, when reference was made to the integrating condenser C1 being discharged during the period of integrating the alternate word charge was also mentioned. It should be understood that if the instrument should be used for the charge mode of operation, phototube V4 should be connected as shown in Fig. 1 in dashed lines with its cathode connected to integrating condenser C1 through relay contacts RC2 and its anode connected to B plus. In the following description the discharge mode of operation will be described. It is to be understood, however, that the charge mode of operation can apply if initial, or zero deflection of the meter is secured with slider of R20 at the E' position instead of E'' and the polarity of the meter is reversed. The mathematical relationship of the resistors in the cathode resistor strings would also be changed so that R10 equals R28, R12 equals R28+R30, R14 equals R28+R30+R32 and the further condition such that, at any position of range switch 10 the total resistance in each of the respective cathode resistor strings shall be equal.

The instrument is initially adjusted by balancing the bridge circuit shown in Figure 1 by adjusting R26 for zero pointer deflection on the meter M1 when the slider 8 of R20 is at point E''; full scale deflection of M1 is obtained with complete rotation of R10 to point E', with the proper selection of R36, with the switch 10 in position three, as shown in Figure 1. It is pointed out that when making the foregoing adjustments, relays RL1 and RL2 are in a de-energized condition so that relay contacts RC2, RC4, RC6, RC8 are closed as shown in Figure 1. With this arrangement condensers C1 and C2 are connected to point E on the voltage divider which as mentioned before, is approximately one-sixth of the plate supply to the double triode V1, or more particularly this voltage should be such that the grids of the two sections of the tube V1 are appreciably negative relative to the cathodes of the tube sections.

For the sake of clarity in describing the operation of the instrument, arbitrarily chosen values of voltage have been assigned. It is emphasized that voltages can be any value depending upon tube types and other circuit parameters which fall within the scope of this invention. It is first assumed that the range switch 10 is in position three, as shown in Figure 1, and that the value of R20 plug R14 exactly equals the sum of the values of R28, R30 and R32.

For the sake of explanation, it is assumed that a current is flowing in the O section of V1, with a grid potential in said section O equal to E such that the IR drop across resistance R28, R30 and R32 equals 50-volts. Likewise in the P section of V1 and IR drop across R14 and R20 equals 50 volts. Under the foregoing conditions with the slider 8 at position E'' no current will flow in the meter M1. The value of R20 bears an arbitrarily chosen relationship to R14 such that if the slider 8 is moved to the position E', said point E' will be 5-volts negative with respect to point E''. It is pointed out that the sensitivity of the meter M1 and the initial selection of R36 are such that when the slider 8 is at position E' there will be a full scale deflection of the pointer on meter M1.

Assuming that an exposure is to be rendered representing a half scale position of the indicator on meter M1, said position is manually secured by adjusting the slider 8 on R20 such that it is at a position of 47½-volts and the half scale deflection of the meter pointer is caused by the 2½-volts across the meter, said slider therefore being approximately half way between the points E' and E''.

To start an exposure cycle the start switch 22 is momentarily depressed to make contact which results in relay RL1 being pulled in and held in through relay contacts RC12 and RC14, by current through the thyratron V6 which is in a conducting condition inasmuch as the photosensitive resistor V8 is exposed to light from the exciter lamp L2; the meter pointer and the lamp, or rather a member on said pointer are so arranged relative to one another that when the meter pointer is at a location other than zero lamp L2 is exposed thereby projecting its light upon V8, the structure being so arranged that when the meter reaches zero the light from L2 is obstructed from impinging on the light sensitive resistor V8. When relay RL1 is pulled in relay contacts RC6 and RC8 are opened as shown in dotted lines in Figure 1, while relay contact RC12 is thrown to a lowermost position, as viewed in Figure 2, and relay contacts RC16 are closed. The closing of relay contacts RC16, assuming that switch 24 is open, turns on any external lights that are present. When relay contacts RC6 and RC8 are open condensers C1 and C2 are disconnected from the voltage source E. It will be observed that since the circuit from condenser C2 is now open it can be said that said condenser is floating, while the condenser C1 is connected to the phototube V4.

Under the foregoing conditions, C1 discharges in direct proportion to the intensity of radiant energy that strikes the cathode of the tube V4. Condenser C1 will continue to discharge so long as light energy strikes the cathode of V4. The amount of discharge from C1 is proportional to the product of the intensity of the light source and the time duration of its exposure upon the tube V4. As C1 discharges, the grid bias in section O of the tube V1 drops with an ensuing decrease of the cathode current through said section O and thus the IR drop across the resistors R28, R30 and R32 likewise drops. This results in the pointer on the meter M1 traveling towards zero, reaching zero when the IR drop across R28, R30 and R32 is 47½-volts or in other words equal to the voltage drop across R14 and that portion of R20 between the slider 8 and the point E'. At this time the pointer on M1 cuts off the light impinging on V8 causing the thyratron V6 to stop conducting by conventional characteristics of a thyratron tube. Once the light from L2 is shut-off from V8 the control grid CG of tube V6 drops below ignition potential and the first time that the plate of said tube becomes negative, by virtue of the fact that it is subjected to A.C. current, the tube ceases to conduct entirely.

When the tube V6 ceases to conduct the relay RL1, being in the plate circuit of said tube, is released. It is pointed out that in the event that a shutter indicated by RL3 or the like is connected in parallel with the pilot light L1 both the light L1 and the shutter connected in parallel therewith will be released. Also, external lights controlled by contacts RC16 of relay RL1 will be extinguished, stopping an exposure after a predetermined quantity of light has registered upon the photo-tube V4. In this manner the instant apparatus is utilized for automatically stopping a photographic exposure. It is however emphasized that the circuitry shown in Figure 2 may be used to control devices other than a camera shutter and/or lights and may be used to control any photosensitive device wherein it is desirable to stop the exposure of such a device upon the receipt thereby of a predetermined quantity of light.

Assuming in the cycle of operation described above, that the condenser C1 was initially charged to 100-volts and that at the end of the cycle has discharged to 90-volts. In other words choice of circuit parameters and cathode follower formula has made a grid voltage change of 10-volts in section O of tube V1 produce a 2½-volt change across the meter M1, or a ratio of 1 to 4. It is pointed out that by choosing other positions of the switch 10 and the proper choice of values for cathode resistor strings, one can maintain the bridge in balance with the slider 8 of R20 in the E" position and still secure any ratio that may be desired between condenser C1 voltage change and meter M1 voltage change. It is pointed out that the various ranges secured by switch 10 do not affect the total resistance of the potentiometer R20 which remains fixed in value as does meter M1 remain fixed in sensitivity by initial selection of R36. Thus it can be seen, referring to the voltage values of the examples above, that the meter M1 has a 5-volt full scale sensitivity and that the potential at E" is always 5-volts greater than the potential at E'. The 5-volt range of the meter can thus always be secured by the manual adjustment of the potentiometer R20 regardless of the position of switch 10 if mathematically the following relationship of resistance values are used. Namely, when switch 10 is in position three as shown, R20 plus R14 equals R28 plus R30, plus R32; when switch 10 is in position two, R20 plus R12 equals R28, plus R30 and when switch 10 is in position one, R10 plus R20 equals R28; it should also be noted that at all positions of range switch 10 the total resistance in each of the respective cathode resistor strings shall be equal.

To clarify the action of range switch 10, let it be assumed that said switch is in position two and that under such a condition the resistance values of the cathode strings are such as to require a 50-volt change in condenser C1 voltage in order to produce the same 2½-volt change across the meter M1 as in the above example, or a ratio of 1 to 20. Under such conditions range position two of the switch 10 requires that the photosensitive tube V4 must be exposed to a quantity of light five times as great as that to produce the same meter point movement as when the switch 10 is in position three as in the first example above.

It is pointed out that while carrying out the cycle described above, relay RL2 is in what may be called an out position thereby causing relay contacts RC2, RC4, and RC14 to remain closed, while relay contacts RC10 are open. It is also pointed out that RL2 comes into play only when it is desired to stop an exposure cycle of the type described above for one reason or another. For example, if after an exposure is initiated, the operator wishes to stop said exposure, stop switch 20 is pressed which energizes relay RL2. The relay RL2 is then held in its energized position by its holding contacts RC10 through contacts RC12 on relay RL1 because relay contacts RC10 close when RL2 is energized. Also when RL2 is energized relay contacts RC14, which are in the holding circuit of relay RL1 open causing relay RL1 to drop out thereby stopping the functions initiated by the opening of relay contacts RC16 and the two lower contacts of RC12 on relay RL1, said relay contacts being closed when RL1 was energized. Relay contacts RC6 and RC8 also close when relay RL1 drops out, being open when relay RL1 was energized. It should be emphasized that the upper points of C1 and C2 are not now connected to point E because, relay RL2 is energized and contacts RC2 and RC4 on relay RL2 are open.

Furthermore, when RL2 is in its energized condition its open contacts RC2 and RC4 allow the bias condensers C1 and C2 to float inasmuch as they are removed from the circuitry, but yet they remain in a charged condition. Under these conditions the bridge remains stable and the meter pointer will not move, at least for the resonable time necessary for the operator to determine what exposure has been given up until the stop point. The operator may then either continue with the exposure from where he left off by depressing the start switch 22 and recommencing the cycle from the point where it left off, or he can press the reset switch 18 for a new exposure. Pressing the reset switch 18 releases the relay RL2 at which time the operator may reset the apparatus for a new exposure by readjusting the potentiometer R20. It should be apparent that pressing the reset switch 18 after the stop switch has been depressed serves to cause RL2 to drop out.

Referring to Figure 1 the importance of condenser C2 is emphasized at this point, inasmuch as said condenser serves to control the P section of tube VI. As mentioned before, condenser leakage, difficulty in maintaining high insulation resistances in practical circuit components, reverse grid current due to residual gas and also grid emission current all tend to introduce an error factor in either charging or discharging the integrating condenser C1, thereby masking the wanted phototube current. The function of condenser C2 will now be readily apparent. If it is considered that C1 and C2 are exact duplicates, which is very nearly the case, and are wired into the circuit physically in the same manner and that O and P triodes are in the same envelope, the leakage or charging factors will be common to both condensers. Therefore due to the bridge design of the circuit, these factors will cancel out, and only the phototube current will affect the deflection of meter M1. It is pointed out that the condenser C1 is permanently connected to the phototube V4. The reason for this may not be readily apparent, but if C1 were disconnected from V4 during the time it was connected to point E, when C1 is reconnected to V4 for its phototube charge or discharge period there would be a sudden drop of voltage across it, as its charge would be shared with the distributed capacitance in the cable which connects V4 with the control unit. The use of voltage regulator V3 and the comparatively low impedance of the point E voltage source compared with the high impedance of the phototube V4 makes this arrangement practical.

Although the above description referring to the schematic diagram is a preferred embodiment of my invention, the essential characteristics of the invention are simply a condenser that may either be charged or discharged by a photosensitive device and means for visually observing the state of charge at any instant. Also, means for adjusting the charge indicating device and means for having this indicating device initiate other apparatus at a predetermined condition of charge. Of course, it is apparent that the indicating means should not interfere with the function of the integrating condenser with its associated photosensitive device.

Examples of modifications from the preferred embodiment without deviating from the scope of the invention, are that other types of photosensitive devices other than the cadmium sulphide cell V3 may be utilized, or it is even possible that the meter pointer M1 can be made to affect relay RL1 by means of physical electrical contacts. Further modifications envision the use of various types of photocells instead of the tube V4 shown; also a single triode could be used instead of the dual triode V1 eliminating the condenser C2 and triode section P, having the bridge section instead of on the cathode of section P, disposed directly across the D.C. supply. Of course in this latter modification the benefit of balancing out condenser leakage errors in C1 cannot be derived.

Many other modifications will become apparent to those skilled in the art such as, for example, other generic tube types may be employed as well as further stages of amplification for ultra sensitive applications. Also electrical control functions can be altered or added to better suit the instrumentation for particular applications, that is, instead of merely actuating a camera shutter the apparatus may be so set up and arranged that the automatic control means shown in Figure 2 could be used to actuate perhaps a plurality of shutters and/or various numbers and arrangements of lights. Furthermore, spectral energy distribution characteristics of the photosensitive device V4 may be altered or modified by suitable color filters to suit particular applications. It is also pointed out that the luminous sensitivity of V4 can be altered by neutral density filters without affecting spectral response characteristics. It should also be noted that a plurality of meters M1 and photosensitive devices V4 with switching means for selecting the particular ones to be used for particular applications can also be used in accordance with this invention.

Also, for particularly precise applications, such schemes as the physical placement, in close proximity, of components sensitive to leakage factors and, also, schemes utilizing lower than rated tube heater and anode voltages to reduce, or eliminate ionic grid current, as well as grid emission effects. Further modification could be the use of the meter M1 in reverse, that is, starting the integrating period with the meter pointer at zero and utilizing a combination of exciter lamp L2 and photo-sensitive device V8, movable relative to the meter scale.

It is believed apparent that the present invention may be widely varied without essential departure therefrom or from the specific embodiment thereof hereinabove described, and all such modifications and departures from the same are contemplated as may fall within the scope of the following claims.

What I claim is:

1. A light integrator comprising, an integrating condenser, means selectively connecting said condenser to a source of charging voltage, a phototube of the current conducting type having a cathode and an anode, said phototube being connected with said condenser, a bridge circuit comprising a pair of branches, one junction point of said branches being connected to a source of current and the other junction being connected to ground, and including a separate current control means in each branch of said bridge, the current control means in one branch being connected to said integrating condenser and controlled by the rate of discharge of said condenser, an indicating meter connected across said bridge, adjusting means in one branch of said bridge and connected to said meter for balancing said bridge to obtain a zero meter reading across the bridge, said adjusting means being adapted to selectively unbalance said bridge thereby giving a meter reading corresponding to the amount of light to be integrated, means for selectively charging or discharging said condenser through said phototube, and the current control means, in the branch of said bridge having the adjusting means, being adapted to vary the current in said branch in response to the discharge of said condenser through said phototube to restore the bridge to a balanced condition, thereby resulting in a zero reading on said meter, and means on said meter for stopping discharge of said condenser when said meter indicator reaches zero, the meter indicator movement from a predetermined quantity to zero corresponding to the integration of a predetermined quantity of light.

2. A light integrator comprising, an integrating condenser connected to a source of condenser charging voltage, a phototube of the current conducting type having a cathode and an anode, said phototube being connected with said condenser, a bridge circuit comprising a pair of branches, one junction point of said branches being connected to a source of current and the other junction being connected to ground, and including a separate current control means in each branch of said bridge, the current control means in one branch being connected to said integrating condenser and controlled by the rate of discharge of said condenser, a meter connected across said bridge for indicating the state of balance between the branches thereof, adjusting means connected to the branch of said bridge to which the integrating condenser is connected for unbalancing the same whereby a meter reading is obtained corresponding to the amount of light to be integrated, means for selectively charging or discharging said integrating condenser through said phototube, and current control means associated with said condenser and one arm of said bridge for increasing or diminishing the current flow in its branch in response to the charge or discharge of said condenser, whereby said bridge is restored to a state of balance and said meter indicator drops to zero, thereby indicating the integration of a predetermined quantity of light.

3. A light integrator comprising, an integrating condenser, a source of voltage connected to said condenser for charging the same to a predetermined value, a phototube of the current conducting type having a cathode and an anode, said phototube being selectively connected to said condenser in shunt relation with a positive voltage source connected thereto, a bridge circuit having a pair of branches, one junction point of said branches being connected to a source of current, and having the other junction point thereof connected to ground, one branch of the bridge comprising a first resistor string comprising a plurality of series connected resistors, and the other branch comprising a second resistor string comprising a plurality of series connected resistors, said resistor strings each having the same resistance above ground, a meter connected across said bridge for indicating the state of balance of said bridge, adjusting means in said first resistor string and connected to said meter for unbalancing said bridge to obtain a meter reading corresponding to the amount of light to be integrated, means for selectively charging or discharging said condenser through said phototube when the latter is exposed to light, current control means connected to said integrating condenser and said second resistor string for varying the current in said second resistor string in response to the charge or discharge of said integrating condenser to restore the meter indicator to the zero point thereon, the movement of said indicator from the predetermined value set thereon to the zero point indicating the integration of a predetermined quantity of light, means for stopping the charge or discharge of said condenser through said phototube when said meter indicator reaches zero, and a second condenser connected to said first resistor string having the same value and physical characteristics as said integrating condenser, whereby errors introduced by the physical and electrical deficiencies of said integrating condenser are balanced out by said second condenser thereby preventing erroneous light integration due to any physical inadequacies of said integrating condenser.

4. A light integrator comprising, a pair of triode tubes both of which are connected as cathode followers, the plates of said triodes being connected with one another to a common source of B plus supply, a first grid bias condenser connected to the grid of said first triode tube, a second grid bias condenser connected to the grid of said second triode, both of said grid bias condensers being connected in parallel with one another through a pair of normally closed relay actuated switches to a regulated source of condenser charging B plus supply whereby said condensers are adapted to be charged to a predetermined level, a phototube of the current conducting type comprising a cathode and an anode, the anode or cathode of which is connected to said first condenser, a first string of series connected resistors in the cathode circuit of said first triode, a second string of series connected resistors including a potentiometer having a variable slider attached thereto in the cathode circuit of said second triode, said respective resistor strings being connected to ground thereby forming a bridge circuit including said triode tubes, an indicating meter connected across said bridge, one side of said meter being connected to the slider on said potentiometer and the other side thereof connected to the opposite branch of said bridge circuit, the values of the resistances in the respective resistor strings being so proportioned that the potentiometer may be adjusted so as to obtain a zero meter reading across the bridge when both triodes are in electrically conducting condition; said meter and said potentiometer being so adjustable relative to one another and said meter being so calibrated that said potentiometer may be adjusted so as to show a meter reading, and thereby indicate a bridge imbalance, proportional to the quantity of light to be integrated, means for opening said normally closed relay actuated switches when said meter has a reading corresponding to the quantity of light to be integrated whereby said first condenser is allowed to charge or discharge through said phototube when the latter is exposed to light thereby lowering or increasing the grid bias in said first triode thereby increasing or decreasing the current flowing in the resistor string associated with that particular grid and which constitutes the arm of the bridge opposite the arm having the potentiometer therein, causing said meter indicator to drop toward zero, and means for terminating the charge or discharge of said first condenser when said meter indicator reaches zero, the indication of zero by said meter being an indication that the desired quantity of light has been integrated.

5. A light integrator comprising a dual triode tube having a first triode section and a second triode section, a B plus supply connected to the plates of both triode sections, a first grid bias condenser and a second grid bias condenser, said grid bias condensers being connected respectively to the control grids of said first and second triode sections, means connecting said grid bias condensers, in parallel with one another, through a pair of normally closed switches to a source of condenser charging B plus voltage whereby said condensers are adapted to be charged to a predetermined level, a phototube of the current conducting type having a cathode and an anode, the anode or cathode of which is connected to said first grid bias condenser; the cathode of said first triode section being connected through a group of series connected resistors to ground, the cathode of said second triode section being connected through a separate series of series connected resistors to ground, one of the resistors in said second cathode circuit being of the potentiometer type having a variable tap thereon, said respective cathode circuits forming the branches of a bridge circuit, a current indicating meter having one terminal thereof connected to the variable tap on said potentiometer and the other terminal through a switch to the other cathode circuit thereby placing said meter in connection across the bridge circuit, said meter and the resistors in each of said cathode circuits being so calibrated and proportioned relative to one another so that said variable tap may be adjusted to give a zero reading on said meter, said potentiometer and said meter being so proportioned whereby adjustment of said potentiometer may be obtained to give a meter reading greater than zero corresponding to the quantity of light to be integrated which corresponds in turn to a state of imbalance in the bridge circuit; means for opening said normally closed switches whereby both condensers are disconnected from said B plus supply and whereby said first condenser is adapted to charge or discharge through said phototube when the latter is exposed to the light to be integrated thereby causing a drop or increase in grid bias in said first triode section and a corresponding increase or drop in cathode circuit current thereby causing the indicator on said meter to move toward zero, and means for reclosing said normally closed switches when said meter indicator reaches zero, a zero indication on said meter indicating that a given quantity of light has been integrated.

6. A light integrator comprising, a dual triode tube having a first triode section and a second triode section, both of said triode sections being connected as cathode followers both plates of said triode sections being connected to a source of B plus voltage, a first grid bias condenser connected to the grid of said first triode section, a second grid bias condenser connected to the grid of said second triode section, a pair of normally closed switches connecting said grid bias condensers to a source of condenser charging voltage, a phototube of the current conducting type having a cathode and an anode, the anode or cathode of which is connected to said first grid bias condenser, the cathode circuit of said first triode section comprising a plurality of series connected resistors, said circuit being connected to ground, the cathode circuit of said second triode section likewise having a plurality of series connected resistors therein, said latter circuit being connected to ground, one of the resistors in said second cathode circuit being of the potentiometer type having a variable tap thereon, said respective cathode circuits constituting the branches of a bridge circuit, an indicating meter connected across said bridge circuit having one terminal thereof connected to said variable tap and the other terminal thereof connected to said first cathode circuit, the resistors in said respective cathode circuits being so proportioned relative to one another that the variable tap may be so adjusted as to give a zero meter reading across said bridge circuit indicating a state of bridge balance, said potentiometer being so proportioned that movement of said variable tap along said potentiometer results in a state of bridge imbalance giving a meter reading corresponding to the quantity of light to be integrated; means for disconnecting both of said condensers from the source of condenser charging voltage whereby said first condenser is adapted to charge or discharge through said phototube when the latter is exposed to light, and said second condenser is allowed to float in its circuit remaining in a charge condition, the charge or discharge of said first condenser through said phototube causing a decrease or increase in grid bias thereby an increase or decrease in cathode current flowing in the cathode circuit in said first triode section, whereby the indicator on said meter is restored to a zero position indicating a restoration of said bridge to a balanced condition from the unbalanced condition which gave a meter reading corresponding to the amount of light to be integrated, thereby indicating that the predetermined quantity of light has been integrated, and means for simultaneously reconnecting said condensers to said source of charging voltage and disconnecting said condensers from said phototube whereby current flow through said phototube is halted thereby ceasing the integrating operation.

7. A light integrator as set forth in claim 6, wherein said first and second condensers and said first and second triode sections are identical respectively to one another whereby errors introduced into one cathode circuit due to physical and electrical imperfections in said condensers and triode sections respectively are balanced out by virtue of being in opposite branches of said bridge circuit.

8. A light integrator comprising a source of A.C. current, a power-on switch in said A.C. source, a power-on indicator light for indicating that the A.C. current is on, an integrating circuit comprising a dual triode having a first triode section and a second triode section, a first grid bias condenser connected to the grid of said first triode section, a second grid bias condenser connected to the grid of said second triode section, means connecting said bias condensers to a source of B plus supply for charging the same to a predetermined voltage level, a pair of normally closed relay actuated switches connecting said grid bias condensers to the source of condenser charging voltage, a phototube of the current conducting type having a cathode and an anode, the anode or cathode of which is connected to said grid first bias condenser, each of said triode sections being connected as a cathode follower, the cathode circuit of said first triode section having a plurality of series connected resistors therein, the cathode circuit of said second triode section likewise having a plurality of series connected resistors therein one of which is a potentiometer having a variable tap thereon, said cathode circuits being connected in parallel with one another and to ground, thereby forming a bridge circuit, a current indicating meter connected across said bridge circuit, said meter having one terminal thereof connected to said variable tap and the other terminal thereof connected to said first cathode circuit, said meter having a movable indicator member provided with means thereon adapted to mask the light emanating from said power-on indicator light, the variable tap on said potentiometer being adjustable thereon to selectively give a zero meter reading to indicate a state of bridge balance, or a meter reading greater than zero indicating a state of bridge imbalance corresponding to the quantity of light to be integrated, the light blocking member on said indicator being removed from light blocking condition when said meter indicator shows a value greater than zero; a control circuit associated with said light integrator circuit, comprising a start circuit connected across said A.C. line comprising a gaseous discharge tetrode, or thyratron, said thyratron having a cathode to plate circuit including a series connected start relay, a normally open start switch connected in series with said A.C. supply and said start relay, said start relay being adapted to open said normally closed switches that connect the grid bias condensers to the source of B plus voltage, said start relay further including a single pole double throw relay actuated switch having the common terminal thereof connected to one side of said A.C. line, said relay normally being maintained in a position maintaining said start relay and thyratron circuit out of the main A.C. line and upon depression of said start switch being adapted to be thrown to its other position thereby connecting said start relay and thyratron circuit across said A.C. line, said thyratron having a grid bias supply including a photosensitive grid bias resistor adapted to allow a quantity of grid bias to be applied to said grid equal to the ignition bias of said tube when it is exposed to light from said power-on indicator light when said bridge balance indicator meter shows a value greater than zero, whereby said thyratron is rendered electrically conductive upon momentary depression of said start switch when said meter shows a value greater than zero, an apparatus control relay connected in parallel with said cathodes to plate circuit of said thyratron whereby suitable apparatus is adapted to be actuated when said thyratron is electrically conductive and until said bridge indicator meter shows a zero value and thus obstructs the flow of light to said photosensitive resistor thereby automatically cutting off said thyratron when a given quantity of light has been integrated.

9. A light integrator as set forth in claim 8, wherein said control circuit further comprises a stop circuit adapted to momentarily stop a light integrating operation after said operation has commenced, said stop circuit comprising a stop relay having the coil portion thereof connected across said A.C. line, said stop relay coil being connected in series with a normally open stop switch whereby said relay coil is adapted to be energized by momentary depression of said stop switch, said stop relay being adapted to simultaneously open a normally closed relay contact and close a normally open relay contact, said normally closed relay contact being connected in series with said start relay circuit through one contact of said single pole double throw relay switch upon closure of said start switch and ensuing actuation of said start relay, whereby said start relay is adapted to drop out upon actuation of said stop relay and ensuing opening of said normally closed stop relay contacts; said normally open stop relay contacts being adapted, upon closure thereof upon actuation of said stop relay to connect said stop relay across said A.C. supply through the other contacts of said single pole double throw switch, thereby holding said stop relay energized until said start switch is again momentarily closed, whereby a once commenced light integration operation is adapted to be resumed after it has been temporarily stopped, without the need to reset the bridge meter circuit.

References Cited in the file of this patent

UNITED STATES PATENTS 2,510,347     Perkins _____ June 6, 1950